United States Patent Office 3,196,128
Patented July 20, 1965

3,196,128
STABILIZED POLYMERS OF ALPHA-MONOOLE-
FINS CONTAINING NICKEL SALTS OF ALKYL
PHENYL SALICYLATES
Joseph H. Tazewell, Akron, and Robert J. Reid, Canal
Fulton, Ohio, assignors to The Firestone Tire & Rubber
Company, Akron, Ohio, a corporation of Ohio
No Drawing. Filed Oct. 7, 1960, Ser. No. 61,056
7 Claims. (Cl. 260—45.75)

This invention relates to stabilization of poly-α-mono-olefins. More particularly, the invention is concerned with stabilization of poly-α-monoolefins against deterioration from heat, light and air.

In recent years great advances have been made as a result of new catalysis concepts in selectively directing the polymerization of α-monoolefins to produce homopolymers and copolymers of extraordinary properties. In the case of ethylene, for example, polyethylene of unusual linearity and unusually improved properties is obtained by following these new concepts of catalysis. In the case of propylene and higher α-monoolefins such as butene-1, pentene-1, hexene-1, methyl substituted butene-1, methyl substituted pentene-1, and other higher α-monoolefins including styrene, methyl styrenes and the like, polymerization can be selectively directed to produce either a highly stereo-regular configuration or a relatively amorphous, non-stereo-regular configuration. Depending on the choice of particular catalyst combinations, the polymers have either highly stereo-regular isotactic or syndiotactic configurations or have non-stereo-regular atactic configurations. These highly desirable new polymers are made possible by employment of a catalyst which is properly selected from, in the one instance, a transition metal compound and in the other instance, a metal-based reducing agent. In the case of the highly linear polyethylene, an effective catalyst combination has been used which is made up on the one hand of a titanium halide and on the other hand of an aluminum hydrocarbon. One of the earliest catalyst combinations of this type was a mixture of titanium tetrachloride and an aluminum tri-alkyl. In order to produce the stereo-regular poly-α-monoolefins from higher α-monoolefins such as propylene, similar catalysts are used. One of the successful combinations of a transition metal compound and a metal-based reducing agent for the production of isotactic polypropylene is a catalyst composed on the one hand of a titanium trihalide such as titanium trichloride, along with a reducing aluminum compound such as an aluminum trialkyl or an aluminum dialkyl halide.

Highly linear polyethylene of the type generally referred to above is, as compared to higher α-monoolefin polymers, substantially less prone to deterioration resulting from exposure to heat and light. The homopolymers of the higher α-monoolefins, as represented by polypropylene, and copolymers of higher α-monoolefins with other α-monoolefins, as represented by ethylene-propylene copolymers, are on the other hand quite sensitive to both heat and light, and require more effective stabilization than does linear polyethylene in order to realize the high degree of commercial utility which such polymers would otherwise enjoy. It has been discovered that stabilization techniques which have been suitable in the case of previously known polymers, as well as linear polyethylene, cannot always be relied upon to effectively stabilize higher poly-α-monoolefins and copolymers thereof. Particular difficulty is experienced in effectively stabilizing polymers containing higher α-monoolefins without unduly changing the normally light color of such polymers.

An object, therefore, of the present invention, is provision of highly heat and light stabilized homopolymers and copolymers of higher α-monoolefin. Another object of the invention is provision of a class of compounds which effectively stabilize homopolymers and copolymers of higher α-monoolefins against deterioration by heat and light. Still another object is effective stabilization of isotactic, syndiotactic and atactic polymers of $C_3$ to $C_9$ α-monoolefins. Still a further object of the present invention is provision of light colored heat and light-stable polymers including copolymers of α-monoolefins. A further object is provision of heat and light-stable isotactic polymers of $C_3$ to $C_9$ α-monoolefins.

These and further objects are obtained in accordance with the invention by incorporating in polymers of $C_3$ to $C_9$ α-monoolefins a relatively small amount of a nickel salt of an alkyl phenyl salicylate of the formula:

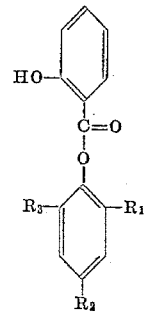

wherein $R_1$, $R_2$ and $R_3$ are hydrogen atoms or $C_1$ to $C_{10}$ alkyl groups, at least one said substituent being an alkyl group.

Representative examples of suitable nickel salts of alkyl groups, at least one said substituent being an alkyl ing alkyl phenyl salicylates:

2-isopropyl-phenyl salicylate
p-Tertiary-butyl-phenyl salicylate
p-Octyl-phenyl salicylate
o-Cresyl salicylate
p-Decyl-phenyl salicylate
2-tertiary-butyl-4-methyl-phenyl salicylate
p-Nonyl-phenyl salicylate
2,4-di-t-amyl-phenyl salicylate
2,4-di-tt-octyl-phenyl salicylate Preparation of the nickel salts effective in practicing the invention suitably involves, by known technique, first reacting at reduced temperature an alkyl phenyl salicylate with sodium methoxide and subsequently reacting, also at reduced temperature, the resulting sodium phenate with anhydrous nickelous chloride to produce the desired nickel salt of the alkyl phenyl salicylate.

Nickel salts of alkyl phenyl salicylates are incorporated or blended in polymers including copolymers of $C_3$ to $C_9$ α-monoolefins by any of the conventional methods used for incorporating additives into polymers. Typical of such methods are deposition from solvents or slurries, dry-blending and blending on a mill or in other suitable masticators.

The amount of nickel salts of alkyl phenyl salicylates effective in the practice of the invention, is always relatively small but varies somewhat in dependence on the particular polymer being protected thereby, as well as on the type and amounts of other additives and pigments suitably employed therewith. Ordinarily, the amount of nickel salts of alkyl phenyl salicylates employed will be in the range of from about 0.01 to about 2.0 parts by weight per 100 parts by weight of polymer with from about 0.1 to about 1.5 parts by weight being preferred.

While the nickel salts of alkyl phenyl salicylates are, when employed as the sole stabilizer, extraordinarily effective in protecting the particular polymers herein involved from deterioration, it is apparent that a wide variety of other stabilizers, antioxidants, light and heat inhibitors, plasticizers, pigments, fillers and other additives can be employed therewith. As a special embodiment of the invention, it has been found that what amounts to a synergistic combination of heat and light stabilizers in the herein involved polymers is the combined employment of the above described nickel salts of alkyl phenyl salicylates with phenolic type antioxidants wherein the hydroxyl groups of such antioxidants are sterically hindered by at least one adjacent hydrocarbon group containing at least 4 carbon atoms. Illustrative phenolic antioxidants of this type useful in the special embodiment of the invention are:

2,6-di-t-butyl phenol
2,6-di-t-butyl-α-dimethyl-p-cresol
2,2′-thiobis (4,6-di-t-butyl phenol)
Ethyl-3,5-di-t-butyl-α-cyano-4-hydroxy cinnamate
4,4′-methylenebis (2-methyl-6-t-butyl phenol)
4,4′-bis (2,6-di-t-butyl phenol)

As in the case of the nickel salts of alkyl phenyl salicylates described above, when the above class of phenolic antioxidants are employed along with the nickel salts in practicing the invention, only relatively small quantities of such antioxidants need be employed. Again, exact quantities will vary to some extent dependent upon the specific polymer and the amount and type of other additives, but ordinarily the phenolic antioxidant will be used in the range of about 0.01 to about 2.0 parts by weight per 100 parts by weight of polymer with from about 0.1 to about 1.0 part of the phenolic antioxidant being preferred.

The effectiveness of the invention will be more clearly understood by reference to the examples which follow.

EXAMPLE 1

Two hundred and sixty grams of 2-isopropyl phenyl salicylate was dissolved in 300 ml. of methanol. Metallic sodium in an amount of 19.2 g. was dissolved in 500 ml. of methanol to produce a solution of sodium methoxide. A solution of 53.7 g. nickelous chloride in 500 ml. of methanol was prepared. While maintaining the 2-isopropyl phenyl salicylate solution in an ice bath, the sodium methoxide and nickelous chloride solutions were alternatively added thereto in small portions. A green precipitate, which was the nickel salt of the 2-isopropyl phenyl salicylate, formed and was washed and dried.

EXAMPLE 2

Sodium metal in the amount of 1.14 g. was dissolved in 50 ml. of methanol to produce a solution of sodium methoxide. In the resulting sodium methoxide solution was dissolved 13.5 g. of p-t-butyl phenyl salicylate to produce the sodium phenate thereof. A solution of 3.2 g. of nickelous chloride in 50 ml. of methanol was prepared. The nickelous chloride solution was added slowly to the sodium phenate of p-t-butyl phenyl salicylate. The nickel salt of the salicylate formed as a light green precipitate which was washed and dried.

EXAMPLE 3

Sodium metal in the amount of 0.79 g. was dissolved in 100 ml. of methanol to produce a solution of sodium methoxide. A solution of 2.15 g. of nickelous chloride in 100 ml. of methanol was prepared. The sodium methoxide solution was cooled to 5° C. and 10.8 g. of p-octyl phenyl salicylate was dissolved therein. The nickelous chloride solution, which had also been cooled, was then added to the methoxide-salicylate solution. The nickel salt of p-octyl phenyl salicylate formed immediately as a light green precipitate and was recovered, washed and dried.

EXAMPLE 4

Sodium in the amount of 2.29 g. was dissolved in 50 ml. of methanol to produce a solution of sodium methoxide. In 100 ml. of methanol was dissolved 32.8 g. of o-cresyl salicylate. A solution of 12.96 g. nickelous chloride in 105 ml. of methanol was prepared. The solutions were all cooled. The sodium methoxide solution was added to the salicylate solution with stirring and to the resulting mixture was added, stepwise, the nickelous chloride solution with stirring. The nickel salt of o-cresyl salicylate formed immediately as a light green precipitate which was recovered, washed and dried.

EXAMPLE 5

Thirty grams of 2-t-butyl-4-methyl phenyl salicylate was dissolved in 100 ml. of methanol. A sodium methoxide solution was prepared by dissolving 2.29 g. of sodium in 50 ml. of methanol. Both solutions were cooled and the sodium methoxide solution was added to the salicylate solution. To the resulting mixture was added, stepwise, a solution of 6.48 g. of nickelous chloride in 150 ml. of methanol. The salt of 2-t-butyl-4-methyl phenyl salicylate precipitated as a green precipitate, which was recovered, washed and dried.

EXAMPLE 6

A solution was prepared by adding 35.4 g. of 2,4-di-t-amyl phenyl salicylate to a mixture of 100 ml. of methanol and 80 ml. of benzene and the solution was cooled. A solution of 2.29 g. of sodium in 50 ml. of methanol was cooled and added to the salicylate solution. To the resulting mixture was added, stepwise, a solution of 6.48 g. of nickelous chloride in 150 ml. of methanol. The reaction product was, for the most part, soluble. The reaction product was first washed with water and then extracted with ether, the benzene layer separating as the bottom layer. The product which was the nickel salt of 2,4-di-t-amyl phenyl salicylate was then recovered from the ether solution by evaporation.

EXAMPLE 7

A sodium methoxide solution was prepared from 2.23 g. sodium and 100 ml. of methanol. To this solution was added 25.6 g. of 2-isopropyl phenyl salicylate. To the resulting mixture was added a solution of 6.5 g. of nickelous chloride in 100 ml. of methanol. A light green precipitate, which was the nickel salt of 2-isopropyl phenyl salicylate, formed immediately. The product was collected, washed and dried.

The above prepared nickel salts of alkyl phenyl salicylates were incorporated into several different isotactic polypropylenes, both alone and along with representative members of the above described phenolic antioxidants. By isotactic polypropylenes is meant a polypropylene containing at least 80% by weight isotactic polymer. The polypropylenes involved in these tests were, in each instance, at least about 95% isotactic. The incorporation was effected in each instance by forming a slurry in acetone of the polypropylene in powder form and the additives. The slurry was then stirred until dry. Light and color stability was determined by exposing molded plaques of the polypropylenes to the rays of an S-1 Sunlamp and observing the number of hours to failure, as well as the color change at completion of the test. Failure was evidenced by the test piece having a badly cracked surface or being so brittle that it broke when bent through an angle of 90°. The comparisons shown hereafter are, in each instance, between a particular polymer containing no additive and the same polymer containing the indicated additives. The amounts of additives employed in the tests were, in each instance, 1.0 part by weight nickel salt where used and 0.5 part by weight additional additive where used, both per 100 parts by weight of isotactic polypropylene.

An isotactic polypropylene was tested with and without additives of the invention. The results of these tests are as follows in Table I:

The polymers including copolymers of $C_3$ to $C_9$ α-mono-olefins, stabilized in accordance with the invention find commercial utility in widely varying applications, including both resinous and rubbery films, sheets, molded and extruded articles, filaments and the like.

*Table I*

| Source of Ni Salt, Example No. | Nickel Salt of— | Other Additive | Hours to Failure | Original Color | Final Color |
|---|---|---|---|---|---|
| Control | | | 375 | White | Tan. |
| 1 | 2-isopropyl phenyl salicylate | | 900 | Grayish | Grayish green. |
| 1 | ----do---- | Octylated, butylated phenol [1] | 1,200+ | ----do---- | Do. |

[1] Wingstay T.

A series of tests were made involving another isotactic polypropylene with and without several of the stabilizers of the invention. The results of these tests are set forth in Table II.

While the invention has been illustrated in detailed terms concerning certain specific embodiments, it must be appreciated and will be understood that the invention includes

*Table II*

| Source of Ni Salt, Example No. | Nickel Salt of— | Other Additive | Hours to Failure | Original Color | Final Color |
|---|---|---|---|---|---|
| Control | | | 250 | White | Tan. |
| 4 | o-Cresyl salicylate | | 500 | Grayish | Light green. |
| 4 | ----do---- | Octylated, butylated phenol | 775 | ----do---- | Do. |
| 5 | 2-t-butyl-4-methyl phenyl salicylate | | 775+ | ----do---- | Greenish yellow. |
| 6 | 2,4-di-t-amyl phenyl salicylate | | 675 | ----do---- | Do. |
| 6 | ----do---- | Octylated, butylated phenol | 900+ | ----do---- | Do. |

Another series of tests of an isotactic polypropylene with and without stabilizers of the invention is reported in Table III as follows:

considerable variation and modification within the spirit thereof and apparent to those skilled in the art.

*Table III*

| Source of Ni Salt Example No. | Nickel Salt of— | Hours to Failure | Original Color | Final Color |
|---|---|---|---|---|
| Control | | 500 | White | Tan. |
| 7 | 2-isopropyl phenyl salicylate | 1,000+ | Light tan | Light greenish tan. |
| 2 | p-t-Butyl phenyl salicylate | 700+ | Light green | Light green. |
| 3 | p-Octyl phenyl salicylate | 1,000+ | Light tan | Yellowish. |

Still another polypropylene was tested with and without combinations of stabilizers in accordance with the invention and the results of these tests are set forth in Table IV which follows:

What is claimed is:

1. A stable polypropylene containing from about 0.01 to about 2.0 parts by weight per 100 parts by weight of polypropylene of a nickel compound identical to that

*Table IV*

| Source of Ni Salt, Example No. | Nickel Salt of— | Other Additives | Hours to Failure | Original Color | Final Color |
|---|---|---|---|---|---|
| Control | | | 250 | White | Off-white. |
| 7 | 2-isopropyl phenyl salicylate | Octylated, butylated phenol | 1,250+ | Light green | Yellow. |
| 2 | p-t-Butyl phenyl salicylate | ----do---- | 1,125+ | ----do---- | Do. |
| 3 | p-Octyl phenyl salicylate | ----do---- | 1,250+ | ----do---- | Do. |
| 7 | 2-isopropyl phenyl salicylate | 2,6-di-t-butyl phenol | 850 | ----do---- | Yellowish green. |
| 7 | ----do---- | 2,6-di-t-butyl-α-dimethyl-amino-p-cresol | 1,000+ | ----do---- | Do. |
| 7 | ----do---- | Ethyl-3,5-di-t-butyl-α-cyano-4-hydroxy cinnamate | 1,000+ | Yellow | Orange tan. |
| 7 | ----do---- | 2,2′-thiobis (4,6-di-t-butyl phenol) | 1,000+ | Gray green | Grayish tan. |
| 7 | ----do---- | α-Methyl cyclohexylated phenol [1] | 850 | Light green | Greenish yellow. |
| 7 | ----do---- | 2,6-di-t-butyl-4-methyl phenol | 1,100+ | ----do---- | Do. |

[1] Obtained by reacting phenol with methyl cyclohexene.

produced by reacting at reduced temperature nickelous chloride with the sodium phenate of an alkyl phenyl salicylate of the formula:

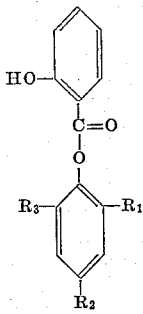

wherein $R_1$, $R_2$ and $R_3$ are substituents selected from the group consisting of a hydrogen atom and a $C_1$ to $C_{10}$ alkyl group, at least one of said substituents being an alkyl group.

2. A stable polypropylene according to claim 1 wherein the salicylate is 2-isopropyl phenyl salicylate.

3. A stable polypropylene according to claim 1 wherein the salicylate is o-cresyl salicylate.

4. A stable polypropylene according to claim 1 wherein the salicylate is 2-t-butyl-4-methyl phenyl salicylate.

5. A stable polypropylene according to claim 1 wherein the salicylate is 2,4-di-t-amyl phenyl salicylate.

6. A stable polypropylene according to claim 1 wherein the salicylate is p-octyl phenyl salicylate.

7. A stable polypropylene according to claim 1 wherein the salicylate is p-t-butyl phenyl salicylate.

References Cited by the Examiner

UNITED STATES PATENTS

| | | | |
|---|---|---|---|
| 2,910,454 | 10/59 | Clark et al. | 260—45.85 |
| 2,933,474 | 4/60 | Handy et al. | 260—45.75 |
| 2,985,617 | 5/61 | Salyer et al. | 260—45.85 |

FOREIGN PATENTS

| | | |
|---|---|---|
| 542,826 | 6/57 | Canada. |
| 1,240,500 | 7/60 | France. |

LEON J. BERCOVITZ, *Primary Examiner.*

ABRAHAM RIMENS, ALPHONSO D. SULLIVAN,
*Examiners.*

UNITED STATES PATENT OFFICE
CERTIFICATE OF CORRECTION

Patent No. 3,196,128                                      July 20, 1965

Joseph H. Tazewell et al.

It is hereby certified that error appears in the above numbered patent requiring correction and that the said Letters Patent should read as corrected below.

Column 2, lines 35 and 36, strike out "groups, at least one said substituent being an alkyl ing", and insert instead -- phenyl salicylates are nickel salts of the following --.

Signed and sealed this 28th day of December 1965.

(SEAL)
Attest:

ERNEST W. SWIDER                                    EDWARD J. BRENNER
Attesting Officer                                        Commissioner of Patents